Figure 1:
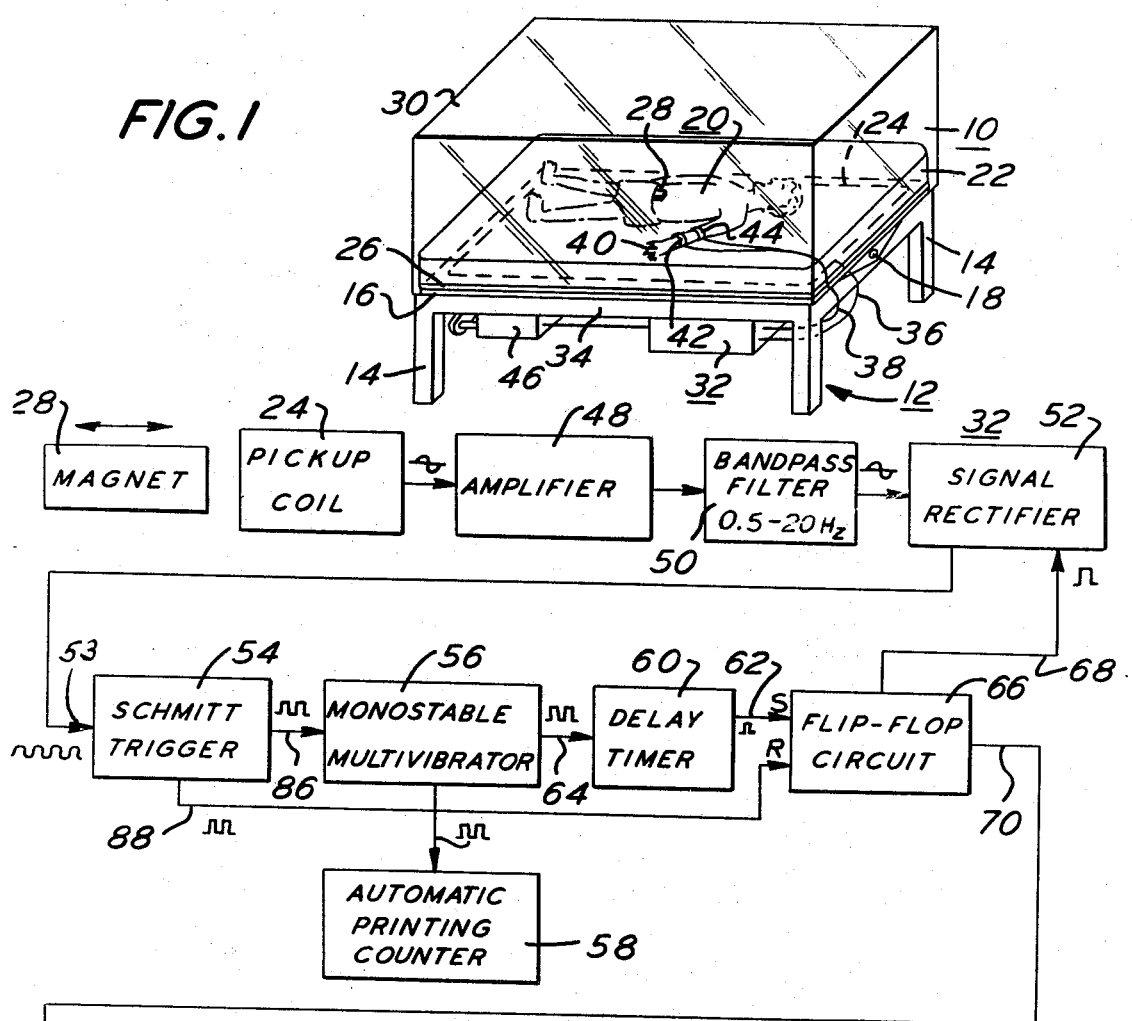

United States Patent

[11] 3,547,106

[72] Inventor William J. Bornmann
Warminster, Pa.
[21] Appl. No. 696,453
[22] Filed Jan. 8, 1968
[45] Patented Dec. 15, 1970
[73] Assignee American Electronic Laboratories, Inc.
Colmar, Pa.
a corporation of Pennsylvania

[54] ACTIVITY DETECTING MEANS
12 Claims, 10 Drawing Figs.
[52] U.S. Cl. ................................................ 128/2,
128/2.05, 340/222, 340/279
[51] Int. Cl. .................................................. A61b 5/05
[50] Field of Search ....................................... 128/2, 2.05,
2.06, 1.3, 1.5(Cursory), (Resp. Digest), 2.07,
2.08; 340/279, 38L, 258; 324/34

[56] References Cited
UNITED STATES PATENTS
| 2,684,671 | 7/1954 | Mendelsohn | |
| 3,063,630 | 11/1962 | Cromley et al. | 128/2.06 |
| 3,089,130 | 5/1963 | Wilson | 128/2.06X |
| 3,133,214 | 5/1964 | Lawson et al. | 340/279 |
| 3,163,856 | 12/1964 | Kirby | 128/2.06X |
| 3,268,845 | 8/1966 | Whitmore | 340/279 |
| | | | 128/2.05UX |
| 3,316,902 | 5/1967 | Winchel et al. | 128/145.5 |
| 3,325,799 | 6/1967 | Farris | 340/279 |
| 3,347,222 | 10/1967 | Kohrer | 128/2 |
| 3,414,896 | 12/1968 | Glick et al. | 340/279X |
| 3,433,217 | 3/1969 | Rieke | 128/2.08 |

FOREIGN PATENTS
| 1,480,160 | 4/1967 | France | 128/2 |

Primary Examiner—Richard A. Gaudet
Assistant Examiner—Kyle L. Howell
Attorney—Jacob Trachtman ABSTRACT: An activity-detecting means such as may be used for detecting the motion of an animate subject, for example the breathing of an infant subject to Apnea Neonatorum, comprising a permanent magnet for being secured with the animate body whose activity is to be monitored, a magnetic pickup coil for being fixed with the frame of reference with respect to which the movement of the animate body is to be detected, and means receiving and processing the output signals of the pickup coil for timing the occurrence of signals and providing an output signal in the form of a visual or an audible alarm, and/or providing electrical or mechanical stimuli to the animate subject under particular conditions such as when the signals provided by the pickup coil have a frequency below a predetermined rate.

INVENTOR
WILLIAM J. BORNMANN

BY Jacob Trachtman
ATTORNEY

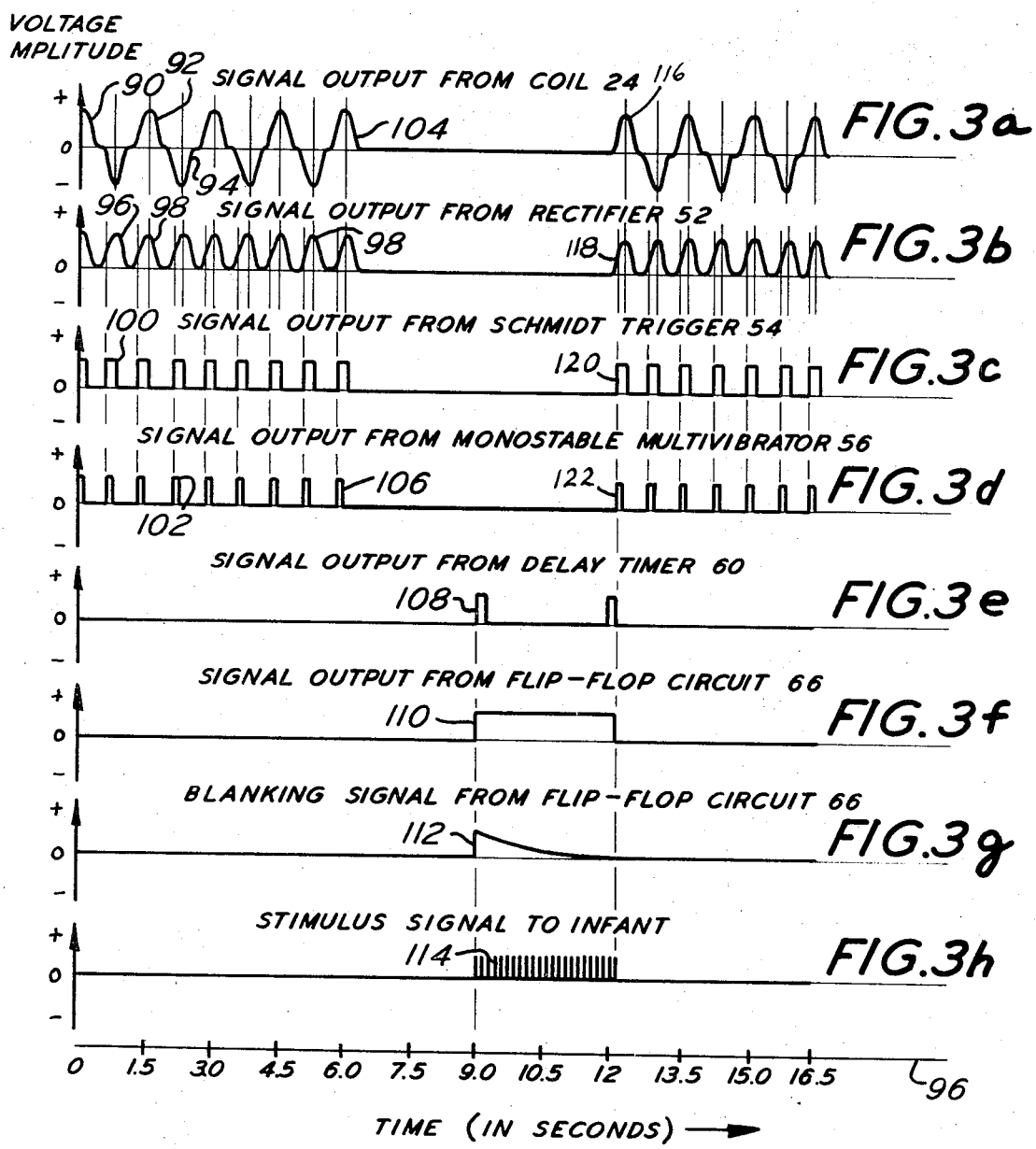

ACTIVITY DETECTING MEANS

The invention relates to an activity-detecting means and more particularly to a means for detecting and monitoring the movements of an animate subject, such as the breathing of an infant which may be subject to Apnea Neonatorum and providing an alarm and/or stimulus to cause the infant to resume breathing when the detected signaLs fall below a predetermined minimum rate.

Episodes characterized by sudden unexpected cessation of respiratory movement are familiar to all who care for premature infants. These attacks of apnea usually occur without warning. This problem (Apnea Neonatorum) has been reported frequently in medical literature and everyone involved with the care of infants is concerned with it.

The invention is most useful in providing a means of detecting apnea. For this purpose a small permanent magnet is fastened to the infant's diaphragm or stomach region as by taping. The magnet is caused to move with each respiratory motion. A flat pickup coil is placed proximately to the infant, such as under the infant's bed pad or at the side of the incubator. The motion of the magnet causes a very small voltage to be induced in the receiving or pickup coil. In the absence of motion, there is no induced voltage. The voltage generated is then amplified by a tuned amplifier which is designed to reject high frequency components which could be caused by adjacent motors and other powerline caused interferences, while amplifying the signal component caused by the infant's respiration.

After passing through the amplifier the signal is passed through a band pass filter further eliminating undesirable components caused by interference. After rectification of the filtered signal it is delivered to a Schmitt trigger and other associated circuits for generating pulses and timing the rate of such pulses so that an alarm signal may be provided where the signal pulse rate drops below a predetermined minimum value. When such an alarm signal is produced, an alarm circuit is energized which provides an audible or visual alarm, and if desirable provides a voltage stimulus to the infant and/or rocks the bed structure in which the infant is resting for the purpose of causing the infant to resume normal breathing activity.

Thus, a principal object of the invention is to provide a means which allows the monitoring of the movements of an animate subject without restricting the subject or connecting wires of such means thereto.

Another object of the invention is to provide a new and improved activity detecting means which monitors the movement of an animate subject and provides means for keeping a record of same and providing an alarm upon the occurrence of a predetermined condition.

Another object of the invention is to provide a new and improved activity detecting means most suitable for monitoring infants subject to Apnea Neonatorum, for detecting over a continuous period of time, the breathing activity of the infant, maintaining a record of breathing rate, providing an alarm when the breathing rate is lower than a predetermined value, and providing electrical or mechanical stimuli to the infant for causing it to resume its natural breathing activity.

Another object of the invention is to provide a highly reliable and effective means for monitoring the activity of an animate subject.

Figure 2:
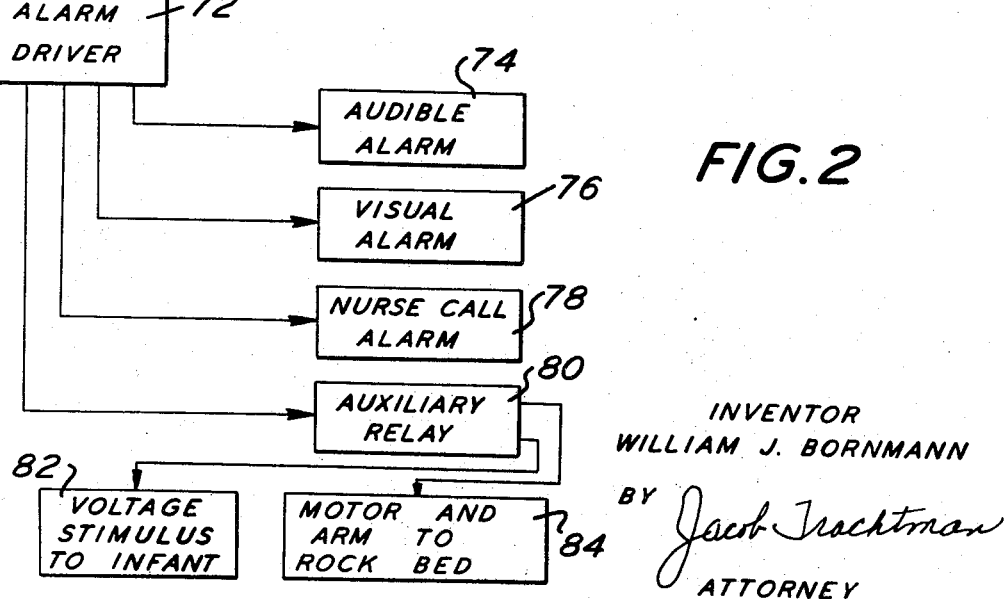

The foregoing and other objects of the invention will become more apparent as the following detailed description of the invention is read in conjunction with the drawings, in which:

FIG. 1 is a perspective view of a crib or incubator for an infant including the activity detecting means of the invention, FIG. 2 is a schematic diagram in block form of the invention, and FIGS. 3a to 3h inclusive are respective graphs illustrating the wave form and timing of the various signals generated by the components of the diagram shown in FIG. 2.

Like reference numerals designate like parts throughout the several views.

FIG. 1 is a perspective view of a bed which may be a crib or incubator 10 including the invention. The crib 10 is provided with a base 12 having legs 14. A rectangular board 16 is pivotally supported upon the base 12 by a pair of bolts 18 at each end, for allowing the board 16 to be rocked from side to side. An infant 20 supported by the crib 10 may rest upon a crib mattress 22 which is supported by the board 16.

A pickup coil 24 comprising a large plurality of fine windings may be encased within a flat sheet 26 of plastic material and is preferably positioned under and surrounding the infant 20, by being received between the board 16 and mattress 22. The pickup coil 24 is illustrated by the dashed lines in FIG. 1.

The infant which is to have its breathing monitored, has secured with its abdomen, as by taping, a small permanent magnet 28. The magnet thus will move up and down respectively, as the infant inhales and exhales each time it breathes. Of course when the infant 20 is placed in the incubator, a closure means 30 is also provided and a source of oxygen is supplied to the infant. Thus, for the purpose of monitoring the breathing of the infant 20, no wires or any other such means need be attached to the infant and the breathing activity of the infant 20 is detected by the movement of the magnet 28 which generates voltage signals in the pickup coil 24 of a detecting means 32 which may be supported at the underside of the horizontal frame 34 of the structure 12. A lead 36 delivers the signal generated in the pickup coil 24 to the detecting means 32, while a pair of leads 38 from the detecting means 32 may be secured to an arm 40 of the infant 20 in spaced relationship at 42, 44 for applying electrical stimuli to the infant when required. The detecting means 32 also includes a motor and rocker arm 46 which is energized for rocking the pivotally secured board 16 and moving the infant 20 when a failure in breathing is detected for stimulating the infant to resume normal breathing activity.

Referring now to the block diagram of FIG. 2 for a more detailed explanation of the operation of the detecting means 32, the movement of the magnet 28 with the breathing or movement of the infant 20 results in the magnetic lines of flux from the magnet 28 increasing or decreasing through the pickup coil 24. The pickup coil 24 provides an output voltage which is related to the rate of change of magnetic flux therethrough, the output voltage being either positive or negative, depending upon whether the lines of flux are increasing or decreasing through the pickup coil.

The amplifier 48 receives and amplifies the signals from the pickup coil 24, and may be tuned to minimize or attenuate signals which are outside the desired frequency range of the desired information signals. The output signal from the amplifier 48 is then received by the band pass filter 50 which further acts to attenuate signals below 0.5 Hertz and above 20 Hertz, while passing the signals between these limits to the signal rectifier 52. The signal rectifier 52 passes all positive going signals and inverts negative going signals, so that all of the output signals are positive going. Such signals are delivered to the input 53 of a Schmitt trigger 54 which has a pulse forming function delivering a substantially rectangular output signal for each input pulse signal having a predetermined minimum amplitude. Since the duration of the output pulse from the Schmitt trigger 54 depends upon the duration of the input signal, the output signals from the Schmitt trigger 54 are delivered to a monostable multivibrator 56 which is triggered by each of the input signals, to deliver a respective output signal of standard amplitude and duration.

Such signals from the multivibrator 56 may be delivered to an automatic printing counter 58 which counts the number of pulses received during each minute and makes a record of same, thereby indicating the breathing rate of the animate subject being monitored. In this connection it may be noted that the breathing rate would be half the number of pulses received by the counter 58, since for each breath, a pulse is generated for the inhalation as well as the exhalation. Thus, upon rectification of the negative signals generated by each breath of the infant by the rectifier 52, two positive output pulses are delivered by the multivibrator 56 for each breath of the infant.

The multivibrator 56 also delivers its output pulse signals to a delay timer 60. The delay timer 60 may be relaxation type oscillator such as the one shown in FIG. 13.9 of page 194 of the General Electric Transistor Manual, 6th Edition. In another form, the delay timer 60 may be a digital counter counting clock pulses and set to deliver an output signal on its line 62 after it reaches a predetermined count, and which is reset to zero count each time a pulse is received on its input line 64. Thus if the delay timer 60 is set to deliver an output pulse after it has counted clock pulses for 3 seconds, and is reset to zero if an input pulse is received on the line 64, the delay timer 60 will only deliver an output pulse on line 62 if an input signal is not received on line 64 within a 3 second interval.

The delivery of an output pulse to line 62 from the delay timer 60, triggers a flip-flop circuit 66 to its set state. Upon being placed in its set state, the flip-flop circuit 66 delivers an output blanking signal to its line 68 inhibiting the signal rectifier 52 from delivering output signals to the Schmitt trigger 54. The output blanking signal 68 may have an effective blanking time of 1 second, and is provided for preventing the delivery of transient signals from the signal rectifier 52 to the Schmitt trigger 54 upon the setting of the flip-flop circuit 66. This action is desirable since with the setting of the flip-flop circuit 66 various alarms and motors may be activated which could result in the generation of transient interference signals which could improperly be delivered to the system for indicating that the infant 20 has resumed its breathing activity.

With the flip-flop circuit 66 in its set condition, an output signal is also delivered over line 70 of the circuit 66 to an alarm driver 72, which may take the form of an electric relay. Upon the activation of the alarm driver 72, an energizing signal may be delivered to an audible alarm 74 such as a bell or buzzer. Similarly the alarm driver 72 may activate, at the same time or separately a visual alarm 76 for indicating the condition detected by the detecting means 32, namely cessation of normal breathing by the infant. If a nursing station is located at a remote location, a nurse call alarm 78 may also be activated at that remote location to summon assistance. In many instances it is desirable to take remedial measures automatically upon the occurrence of the emergency situation. Under such conditions, the alarm driver 72 may activate an auxiliary relay 80 which can result in the delivery of a voltage stimulus 82 to the infant and/or activate a motor and arm 46 to rock the bed (illustrated by block 84 in FIG. 2) for causing the infant to resume normal breathing at the earliest possible time.

It has been found that a shock to the infant such as delivery of a voltage stimulant or the rocking of the infant is sufficient to cause the infant to resume its natural breathing activity. The important factor, however, is that action must be taken immediately since failure to do so will result in the death of the infant by its failure to breathe. Thus, a most essential factor is the constant monitoring of the infant's breathing, since the failure to know that the infant has ceased its breathing activity is fatal.

With the resumption of breathing of the infant 20, the magnet 28 resumes corresponding reciprocating motion generating output voltage signals in the pickup coil 24 which after amplification is rectified by the wave signal rectifier 52 are again delivered to the Schmitt trigger 54. In this connection, it is noted that, the signal rectifier 52 is inhibited only for a period of approximately 1 second after the flip-flop circuit 66 is placed in its set condition, the signal rectifier 52 being again conditioned thereafter, to pass fully rectified signals therethrough. With the receipt of the first input signal by the Schmitt trigger 54, in addition to delivering an output signal over the line 86 to the monostable multivibrator 56, it also delivers an output signal over the line 88 to the reset input of the flip-flop circuit 66 returning this circuit to its reset condition. With the circuit 66 in its reset condition, the output signal over line 70 to the alarm driver 72 is removed, deenergizing the alarm driver which results in the deenergization of the alarms 74, 76 and 78 as well as deactivating the auxiliary relay 80 removing the voltage stimulus 82 and deenergizing the motor and arm 46 for rocking the bed.

Upon further cessation of proper breathing activity, either by the breathing being so shallow as not to generate an appropriate pickup signal by the coil 24 or the rate of breathing being so low that the delay timer 60 delivers a set signal to the flip-flop 66, the above cycle is repeated in which appropriate alarms are given and desired stimuli are applied to the animate subject for correcting the situation.

Refer now to FIGS. 3a to 3h inclusive which are respective schematic representations of signals produced by the detecting means 32 illustrating their wave form and their time relationships.

FIG. 3a graphically discloses the output voltage signal 90 from the pickup coil 24. The signal 90 comprise positive portions 92 and negative portions 94 corresponding respectively to when the infant is either inhaling or exhaling during each breathing cycle. With reference to the time scale given in seconds at 96, it is apparent that the infant is taking a breath approximately each second and a half, providing a rate of 40 breaths per minute which is within the normal range.

FIG. 3b graphically illustrates the rectified wave form 96 of the signal from the rectifier 52. In this connection it is noted that each of the negative pulses 94 of FIG. 3a have been rectified as a pulse 98 whereas the positive pulses 92 are also delivered as positive pulses from the output of the rectifier 52.

FIG. 3c graphically illustrates the delivery of an output pulse 100 by the Schmitt trigger 54 upon the receipt of a positive signal from the rectifier 52, while FIG. 3d discloses the delivery of output pulses 102 upon the receipt of the output signal 100 from the Schmitt trigger 54. It is noted again that the Schmitt trigger 54 delivers an output signal upon receiving a positive going input signal having a minimum voltage amplitude. The duration of the output pulse signal from the Schmitt trigger, however, is affected by the duration of its input signal. The output signals 102 delivered by the monostable multivibrator 56 are uniform in amplitude and duration.

As previously noted, an output signal from the delay timer 60 over its line 62 is prevented by the resetting of the delay timer 60 by signals received over line 64 from the monostable multivibrator 56 with a spacing of 3 seconds or less. From FIG. 3a it is noted that the breathing activity of the infant 20 ceases for a time after the signal pulse 104 from the pickup coil 24. The corresponding signal pulse 106 shown in FIG. 3d from the multivibrator 56 occurs at 6 seconds on the time scale 96. After the elapse of 3 seconds or at 9 seconds on the time scale 96, an output pulse 108 is delivered by the delay timer 60 shown in FIG. 3e to the set input of the flip-flop circuit 66. Upon the occurrence of the delay timer signal 108, the flip-flop circuit 66 is placed in its set condition and a positive output signal 110 is delivered by it to the alarm driver 72 as illustrated in FIG. 3f. At the same time, the flip-flop circuit 66 also delivers an exponentially declining blanking pulse signal 112 to the signal rectifier 52 to prevent its passage of transient signals. Signal 112 is effective for inhibiting output signals from the rectifier 52 for approximately 1 second, after which its amplitude is sufficiently reduced to allow the signal rectifier 52 to resume its normal operation.

When the flip-flop circuit 66 is in its set condition, the alarm driver 72 is activated and various alarms may be energized. FIG. 3h shows the generation of a plurality of stimulus signals 114 for application to the infant between spaced locations on its arm 40, as illustrated in FIG. 1. Signals 114 have been found effective by being applied momentarily and repeatedly as illustrated by the plurality of space vertical lines in FIG. 3h. Of course the duration and spacing between such signals may be adjusted to provide the most effective results. Of course, the crib 10 may be rocked or not as desired with the application of the voltage stimuli or it may be desirable in particular applications to rock the crib without the application of such voltage stimuli.

Upon the resumption of breathing activity by the infant the pickup coil again delivers output signals, the first such pulse signal 116 being illustrated in FIG. 3a. The production of the pulse signal 116 results in the initiation of output signals from the rectifier 52, the first such pulse being shown at 118 in FIG. 3b. The pulse 118 is delivered to the Schmitt trigger 54 which generates the pulse 120 shown in FIG. 3c. The pulse 120 from the Schmitt trigger 54 is delivered over line 88 to the flip-flop circuit 66 resetting the circuit 66 and terminating its output signal 110 as shown in FIG. 3f. This also results in the termination of the stimuli signals 114 as illustrated in FIG. 3h.

The generation of the output signals from the Schmitt trigger 54 result in the generation of output signals 122 from the multivibrator 56 illustrated in FIG. 3d which are delivered to the delay timer 60. Since the output signals 122 from the multivibrator 56 are spaced less than 3 seconds apart, the delay timer 60 is prevented from delivering an output signal over the line 62 for setting the flip-flop circuit 66. Thus, as the infant continues to breathe normally the multivibrator 56 prevents the setting of the flip-flop circuit 66. However, as soon as the infant ceases to breathe for at least 3 seconds or its breathing is so shallow that the magnet 28 moves insufficiently to produce a detectable signal from the pickup coil 24 indicative of a nonnormal condition, the multivibrator 56 ceases to deliver the required signals to the delay timer 60 to prevent its delivery of a setting signal to the flip-flop circuit 66. Under those circumstances, as explained before, an alarm situation is indicated and the detecting means 32 operates to summon assistance and take automatic action where desired to restore the breathing activity of the infant.

Although the invention has been particularly illustrated with regard to the detection of the cessation of normal breathing by infants, the problem being medically designated Apnea Neonatorum, it will be obvious to those skilled in the art that the invention may find wide application with appropriate modification to meet the individual design circumstances but without substantial departure from the essence of the invention. Thus, in a situation where it is desired to monitor the motions of animals for various scientific studies, the application of the magnetic means 28 to the animal and the appropriate placement of a pickup coil will allow the detection of the animal's various movements and recordation of same without interfering with the animal's normal activities, such as would be the result where wires or other encumbrances are attached to the animal.

I claim:

1. An activity-detecting means comprising a first means adapted for being secured with an animate body whose activity is to be monitored within a given location providing a magnetic field, second means for detecting the movement of said magnetic field of said first means and delivering an output signal, and third means for receiving and processing the output signal of said detecting means for providing an output information signal, said first means being a permanent magnet and said second means including a magnetic pickup coil fixed with a frame of reference at said location with respect to which the movement of said animate body is to be monitored and encompassing the location where said body is to be monitored with said secured-first magnetic means.

2. The means of claim 1 in which said third means includes pulse-forming means responsive to a signal derived from said second means for producing output pulses, and means for timing the occurrence of signals provided by said pulse forming means for providing said output information signal.

3. The means of claim 2 in which said third means includes means receiving and rectifying the output signal from said first means and delivering said rectified signal to said pulse-forming means for producing said output pulses.

4. An activity-detecting means comprising a first means adapted for being secured with an animate body whose activity is to be monitored providing a magnetic field, second means for detecting the movement of said magnetic field of said first means and delivering an output signal, and third means receiving and processing the output signal of said detecting means for providing an output information signal, said first means being a permanent magnet and said second means including a magnetic pickup coil for being fixed with a frame of reference with respect to which the movement of said animate body, at the location where said magnetic means is secured, is to be monitored, said third means including pulse forming means responsive to a signal derived from said second means for producing output pulses and means for timing the occurrence of signals provided by said pulse-forming means for providing said output information signal, said third means including means for receiving and rectifying the output signal from said first means and delivering said rectified signal to said pulse-forming means for producing said output pulses, said timing means including a delay timer receiving said pulse signals from said pulse-forming means and delivering an output signal only when the time between said received pulses exceeds a predetermined time delay and a bistable circuit having set and reset states, said circuit receiving the pulse signals from said pulse-forming means and said output signals from said delay timer, said circuit assuming its set state upon receiving a pulse signal from said delay timer and delivering an output signal, said circuit assuming its reset state upon receiving a pulse signal from said pulse-forming means and terminating its output signal.

5. The means of claim 4 in which said bistable circuit provides a blanking pulse of predetermined duration upon assuming its set state, said blanking pulse being delivered to said signal rectifying means for inhibiting output signals from said rectifying means during the occurrence of said blanking pulse to minimize transient output signals.

6. The means of claim 4 including output means for delivering an output signal responsive to the output signal from said bistable circuit.

7. The means of claim 6 including a structure adapted for supporting an infant and in which the permanent magnet of said first means is adapted for being applied to the chest region of an infant for movement responsive to the breathing of the infant, and the magnetic pickup coil of said second means which is responsive to the movement of said magnet, is fixed with the structure adapted for supporting said infant.

8. The means of claim 7 in which said second means includes amplifying means receiving signals from said pickup coil and amplifying and delivering signals in the 0.5 to 20 Hertz frequency range for delivery to the rectifying means of said third means.

9. The means of claim 7 including counting means receiving output signals from the pulse forming means of said third means for recording the breathing rate of said infant.

10. The means of claim 7 in which said output means provides an alarm upon receiving an output signal from said bistable circuit.

11. The means of claim 7 in which said output means provides an output stimulus signal to said infant upon receiving an output signal from said bistable circuit for the purpose of causing said infant to resume breathing at a predetermined rate.

12. The means of claim 7 in which said output means includes means for moving the structure adapted for supporting said infant upon receiving an output signal from said bistable circuit for the purpose of causing said infant to resume breathing at a predetermined rate.